United States Patent
Lee et al.

(10) Patent No.: US 7,184,476 B2
(45) Date of Patent: Feb. 27, 2007

(54) ADAPTIVE EQUALIZER FOR CONTROLLING OPERATION THEREOF BY USING SIGN AND ABSOLUTE VALUE OF OUTPUT SIGNAL THEREOF

(75) Inventors: Jae-Wook Lee, Osan (KR); Dae-Yun Shim, Gwangmyung (KR); Jung-Hyun Lee, Seoul (KR)

(73) Assignee: Samsung Electronics Co., Ltd., Gyunggi-do (KR)

( * ) Notice: Subject to any disclaimer, the term of this patent is extended or adjusted under 35 U.S.C. 154(b) by 805 days.

(21) Appl. No.: 10/316,019

(22) Filed: Dec. 11, 2002

(65) Prior Publication Data
US 2003/0108097 A1   Jun. 12, 2003

(30) Foreign Application Priority Data
Dec. 11, 2001   (KR) .............................. 2001-78275

(51) Int. Cl.
*H04L 27/01* (2006.01)
(52) U.S. Cl. ...................................... 375/232
(58) Field of Classification Search .............. 375/229, 375/233, 232, 230, 316, 346, 231; 379/406.01, 379/406.06, 406.08; 381/71.1, 71.8, 71.11
See application file for complete search history.

(56) References Cited

U.S. PATENT DOCUMENTS 5,999,349 A   12/1999  Choi 6,732,129 B1 *   5/2004  Ashjaee ........................ 708/322
6,907,092 B1 *   6/2005  Yakhnich et al. ............ 375/346

FOREIGN PATENT DOCUMENTS

| EP | 0 840 318 A2 | 5/1998 |
| EP | 1 018 732 A2 | 7/2000 |
| EP | 1 098 313 A2 | 5/2001 |
| JP | 6-77772 A | 3/1999 |
| JP | 2001-155429 A | 6/2001 |
| JP | 2001-256736 A | 9/2001 |

* cited by examiner

Primary Examiner—Pankaj Kumar
(74) Attorney, Agent, or Firm—Sughrue Mion, PLLC

(57) ABSTRACT

An adaptive equalizer has an FIR filter for generating an equalized output signal by equalizing an RF input signal, a sign detector for detecting a sign of the output signal, an absolute value calculator for calculating an absolute value of the output signal, a level error detection part for calculating an error by using a sign and an absolute value, and a coefficient calculator for calculating coefficients of the FIR filter based on the error. The level error detection part detects a detection level of the output signal, the detection level which is one of reference values required by a channel characteristic model of a decoder provided with the output signal, and calculates the error which is the difference between the detection level and a real level of the output signal. Since the sign and the value of the signal are used for calculating the error, the reliability of the error calculation increases.

18 Claims, 9 Drawing Sheets x : y = b : (a+b)
PR(a,b,b,a)

case1: {sgn(b)=sgn(c)=sgn(d)=-1} &
{abs(b)>Th}&{abs(c)>Th}&{abs(d)>Th} case1: {sgn(a)=+1} & {sgn(b)=-1} & {abs(a)>abs(b)}
case2: {sgn(b)=+1} & {sgn(c)=-1} & {abs(b)<abs(c)}
case3: {sgn(c)=-1} & {sgn(d)=+1} & {abs(c)>abs(d)}
case4: {sgn(d)=-1} & {sgn(e)=+1} & {abs(d)<abs(e)}

ZERO LEVEL a b c d e case1:{sgn(c)≠sgn(d)} & {abs(c)<abs(d)}
case2:{sgn(b)≠sgn(c)} & {abs(b)>abs(c)}

+MID LEVEL a b c d e case1:{sgn(a)=-1} & {sgn(b)=+1} & {abs(a)>abs(b)}
case2:{sgn(b)=-1} & {sgn(c)=+1} & {abs(b)<abs(c)}
case3:{sgn(c)=+1} & {sgn(d)=-1} & {abs(c)>abs(d)}
case4:{sgn(d)=+1} & {sgn(e)=-1} & {abs(d)<abs(e)} case1: {sgn(b)=sgn(c)=sgn(d)=+1} &
{abs(b)>Th}&{abs(c)>Th}&{abs(d)>Th}

ADAPTIVE EQUALIZER FOR CONTROLLING OPERATION THEREOF BY USING SIGN AND ABSOLUTE VALUE OF OUTPUT SIGNAL THEREOF

BACKGROUND OF THE INVENTION

1. Field of the Invention

The present invention relates to an adaptive equalizer and an adaptive equalization method, and more particularly, to an adaptive equalizer for equalizing an input signal to a signal having the level required by a decoder, and an adaptive equalization method performed by the equalizer. The present application is based on Korean Application No. 2001-78275 which is incorporated herein by reference.

2. Description of the Related Art

To equalize an input signal transmitted through a channel having continuously changing characteristics into a desired type of signal, an equalizer having an FIR filter function for equalizing the input signal is generally used.

FIG. 1 is a block diagram showing a conventional adaptive equalizer having an FIR filter. Specifically, an adaptive equalizer for a high-speed optical disk system introduced in EP1014363 titled "Reproducing Apparatus" is shown in FIG. 1. As shown in FIG. 1, the conventional adaptive equalizer has an FIR filter 10, a zero detector 14, a tap delay circuit 16, a temporary decision block 12, and a coefficient calculator 18.

The FIR filter 10 generates an equalized output signal by equalizing the input signal. In an optical disk system, the input signal is an RF signal read by a pick-up from a disk such as a DVD or a CD. The output signal output from the FIR filter 10 is provided to a viterbi decoder (not shown).

The zero detector 14 detects zero value of the equalized output signal output by the FIR filter 10. The zero detector 14 outputs '1' as a detection level value when the value of the equalized output signal has a value close to '0'. Otherwise, the zero detector 14 outputs '0' as the detection level value.

The tap delay circuit 16 creates a series of zero detection values by delaying a zero detection signal detected by the zero detector 14. In other words, the tap delay circuit 16 creates the zero detection values (for example, 01000100010) by delaying the value of '0' or '1' created by the zero detector 14 by using a delaying element.

The zero detection values from the tap delay circuit 16 are input to the temporary decision block 12, and also the equalized output signal from the FIR filter 10 is input to the temporary decision block 12. The temporary decision block 12 decides an error of the equalized output signal by using the zero detection values and the equalized output signal. In other words, the temporary decision block 12 detects a level of the output signal of the FIR filter 10 using the zero detection values. After that, the temporary decision block 12 calculates the error by calculating a difference between the detection level and a real level of the output signal of the FIR filter 10.

The error from the temporary decision block 12 is input to the coefficient calculator 18, and also a signal achieved by delaying the input signal for a predetermined time is input from the FIR filter 10 to the coefficient calculator 18. The coefficient calculator 18 calculates new coefficients to be input into the FIR filter 10 by using the error, the delayed input signal and the present coefficients of the FIR filter 10. At this time, the coefficient calculator 18 applies an LMS (Least Mean Square) algorithm to the error and the delayed input signal, calculates the coefficients required by the FIR filter 10, and provides the calculated coefficients to the FIR filter 10.

The FIR filter 10 is modified to have various features in accordance with coefficients created by the coefficient calculator 18. Accordingly, the FIR filter 10 can equalize the input signal to output a signal having a desired output level.

As described so far, the conventional adaptive equalizer uses the zero detection value and the equalized output signal to allow the temporary decision block 12 to calculate the error. Therefore, the credibility of the error is determined by the accuracy of the zero detection value.

However, in the conventional adaptive equalizer, since the zero detector 14 detects as zero a change in sign considering only the sign of the equalized output signal, there might be a problem that a frequent malfunction can occur when the zero detector 14 detects zero in the case that there are a lot of changes in the signal input into the zero detector 14.

For example, when the state of the channel through which the input signal is transmitted is not satisfactory, as for example, when there is much noise or a phase error in the input signal, there might be undesired changes to the input signal. Especially, when the level of the input signal frequently changes in the area around zero due to the noise included in the input signal, the zero detector 14 outputs the output signal of '1'. Therefore, the temporary decision block 12 cannot calculate the error accurately, and the coefficient calculator 18 is mis-operated. Consequently, the entire capability of the equalizer is deteriorated.

Furthermore, the deterioration of the input signal causes divergence of the coefficients, thus a serious error can occur in the operation of the system. Especially, when the conventional adaptive equalizer is used in a system such as an optical disk system having frequent abrupt deterioration of the signal, a serious problem can be generated in the stability of the system. The distortion of the signal in the optical disk system can be caused by several factors, mainly by fingerprints or foreign substances clinging to the surface of the optical disk due to carelessness of a user. Moreover, distortion of the input signal can be generated in the case that the RF signal is not input at all, such as when an area to be read is changed from a certain area of the disk to another area.

When an abnormal signal is input into the adaptive equalizer, the coefficients of the equalizer may diverge. Therefore, although a normal input signal is received afterwards, it might take a long time for the input signal to returned to normal coefficients, or the input signal cannot be returned to normal coefficients.

SUMMARY OF THE INVENTION

The present invention has been made to overcome the above-mentioned problems. Thus, an object of the present invention is to provide an adaptive equalizer having an improved equalization performance due to an accurate error calculation rate.

Another object of the present invention is to provide an adaptive equalizer capable of returning to a stable state promptly, when coefficients of the equalizer diverge due to the deterioration of an input signal.

The above object is accomplished by providing an adaptive equalizer comprising: an FIR filter for generating an equalized output signal by equalizing an RF input signal; a sign detector for detecting a sign of the output signal; an absolute value calculator for calculating an absolute value of the output signal; a level error detection part for detecting a detection level of the output signal using the sign and the absolute value, the detection level which is one of reference values required by a channel characteristic model of a decoder provided with the output signal, the level error detection part for calculating an error which is the difference between the detection level and an actual level of the output signal; and a coefficient calculator for calculating coefficients of the FIR filter based on the error, and for providing the calculated coefficients to the FIR filter.

Here, the level error detection part detects the detection level, by using an object signal which is an object for detecting the detection level, and a predetermined number of signals input before and after the object signal.

The level error detection part judges that the object signal has a detection level corresponding to a maximum value among the reference levels when the signs of the object signal and two signals respectively input just before and just after the object signal are identical to each other. At this time, the level error detection part judges that the object signal has the detection level corresponding to the maximum value among the reference levels when magnitudes of the object signal and the two signals respectively input just before and just after the object signal are all greater than a predetermined threshold value.

Moreover, the level error detection part judges that the object signal has a detection level corresponding to one of a middle value and zero value among the reference levels when the signs of the object signal and two signals respectively input just before and just after the object signal are not identical to each other. At this time, the level error detection part judges the detection level according to a comparison result of the magnitudes of the two signals input just before and just after the object signal.

On the other hand, the adaptive equalizer according to the present invention further comprises a coefficient re-initialization part for judging whether a gain of the FIR filter diverges or not, based on the coefficients, the coefficient re-initialization part for providing a malfunction detection signal to the coefficient calculator when judging that the FIR filter diverges.

The coefficient calculator sets predetermined initial values as the coefficients and provides the coefficients to the FIR filter, when the malfunction detection signal is input thereto.

According to the present invention, not only a sign of the signal but also a value of the signal is used for calculating the error. Thus, the accuracy of the error calculation increases.

Furthermore, when it is judged that a DC gain of the FIR filter diverges, the coefficient calculator initializes coefficients of the FIR filter as stable values. Therefore, a stable operation of the adaptive equalizer can be guaranteed.

In the meantime, according to the invention, an adaptive equalization method performed by the above-described adaptive equalizer is provided.

BRIEF DESCRIPTION OF THE DRAWINGS

The above-mentioned objects and features of the present invention will be more apparent by describing the preferred embodiment of the present invention by referring to the appended drawings, in which.

DETAILED DESCRIPTION OF THE PREFERRED EMBODIMENT

From now on, the present invention will be described in greater detail by referring to the appended drawings. In the preferred embodiment of the present invention, the example of the equalizer of the present invention applied to a high speed optical disk system will be described. Especially, an example, which is applied to equalize an input signal input after being reproduced from a disk to be a signal having, a signal level required by a viterbi decoder, will be described.

Figure 1:
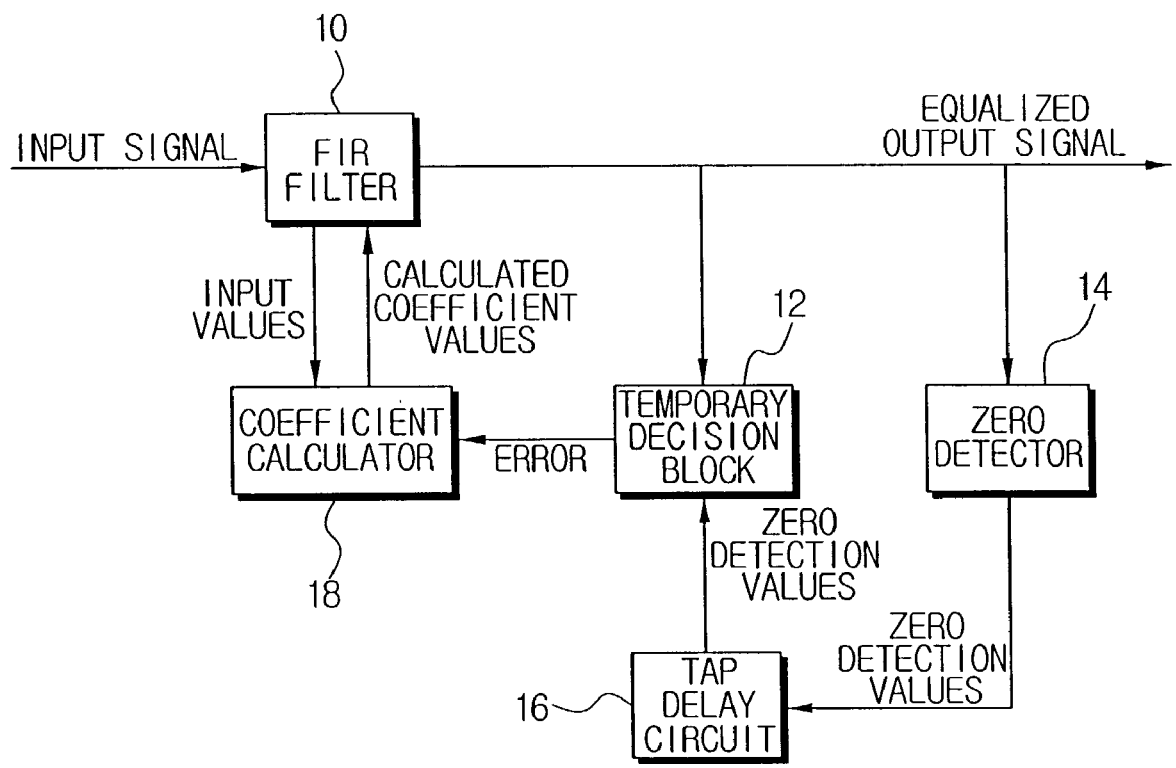
FIG. 1 is a block diagram showing a conventional adaptive equalizer.
Figure 2:
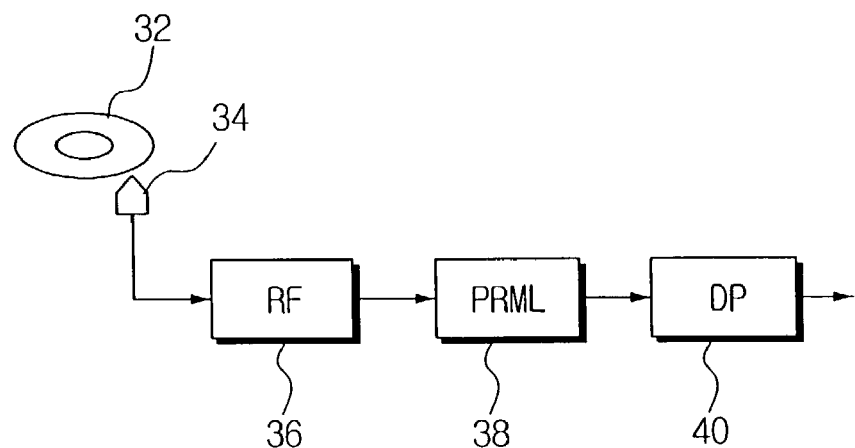
FIG. 2 is a block diagram showing some part of an optical disk system having an equalizer according to the present invention.

As shown in FIG. 2, an optical disk system has a pick-up 34 for reading data recorded on a disk such as a DVD or a CD, an RF block 36 for converting a signal read by the pick-up 34 into an RF signal, a DP (data processor) block 40 for processing a signal output from the RF block 36, and a PRML (partial response maximum likelihood) block 38 for improving a bit error rate of the RF signal output from the RF block 36 and transmitting the improved RF signal to the DP block 40.

Figure 3:
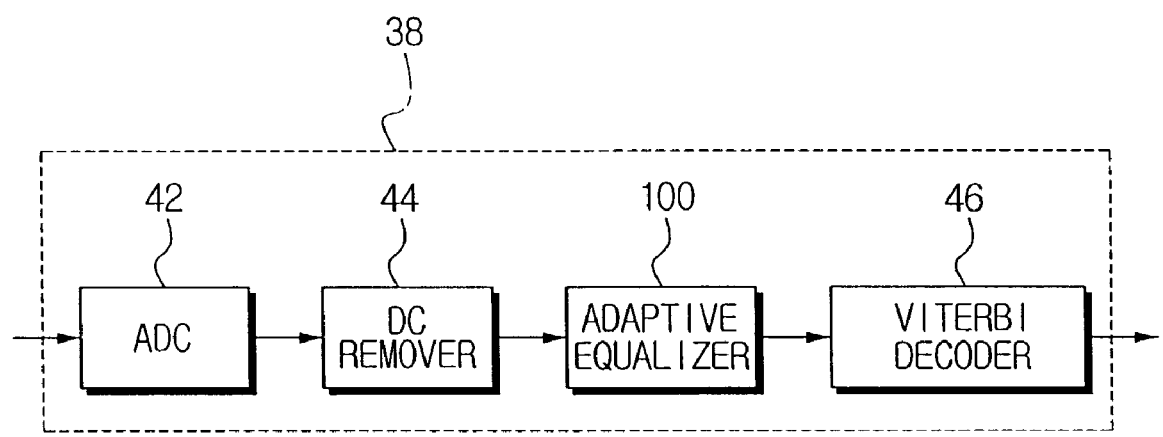
FIG. 3 is a block diagram showing a PRMK block of FIG. 2 in great detail.

As shown in FIG. 3, the PRML block 38 has an ADC (analog-to-digital converter) 42 for converting the RF signal into a digital signal, a DC remover 44 for removing a DC component of the RF signal, an equalizer 100 for equalizing the digital RF signal from which the DC component has been removed, and a viterbi decoder 46 for recovering the data by decoding the signal equalized at the equalizer 100. The equalizer 100 equalizes the input RF signal to an output signal having the level required by the viterbi decoder 46.

Figure 4:
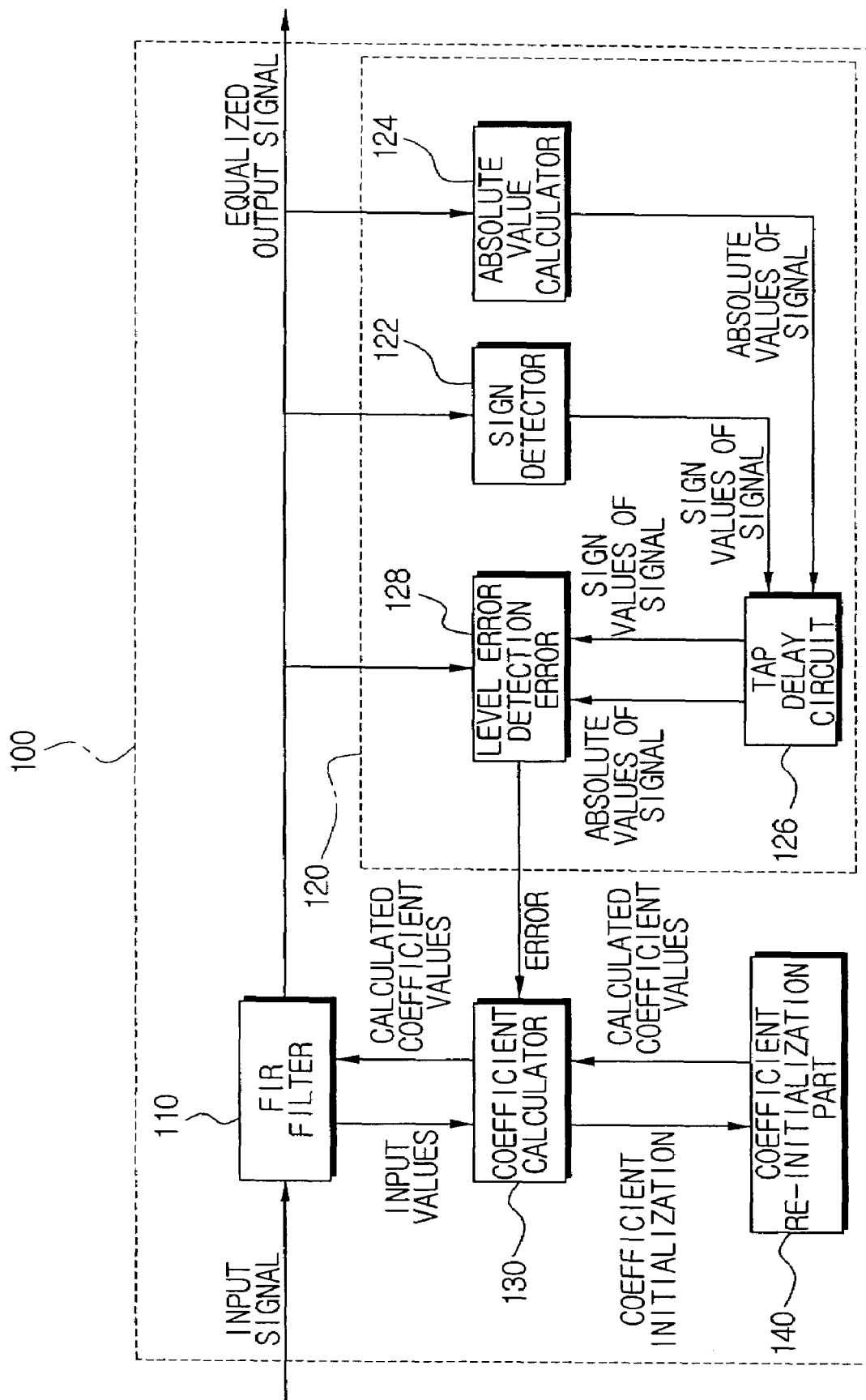
FIG. 4 is a block diagram showing an adaptive equalizer according to the present invention.

FIG. 4 is a block diagram showing the adaptive equalizer 100 according to the present invention. As shown in FIG. 4, the adaptive equalizer 100 according to the present invention has an FIR filter 110, an error detection part 120, a coefficient calculator 130, and a coefficient re-initialization part 140. The error detection part 120 comprises a sign detector 122, an absolute value calculator 124, a tap delay circuit 126, and a level error decision part 128.

The FIR filter 110 equalizes the RF input signal to a form desired by a user and creates the equalized output signal. The characteristic of the equalization of the FIR filter 110 is decided by coefficients input from the coefficient calculator 130. The output signal output from the FIR filter 110 is provided to the viterbi decoder 46.

The sign detector 122 detects the sign of the equalized output signal output from the FIR filter 110. In other words, the sign detector 122 outputs '1' when the sign of the equalized output signal is positive, and '−1' when the sign of the equalized output signal is negative. The sign of the output signal can be easily detected by using the most significant bit (MSB) of the input digital signal.

The absolute value calculator 124 calculates an absolute value of the equalized output signal.

The tap delay circuit 126 creates a series of sign values and a series of absolute values by delaying the sign values detected by the sign detector 122 and the absolute values of the signal calculated by the absolute value calculator 124.

The sign values, the absolute values and the output signal of the FIR filter 110 are input to the level error decision part 128 from the tap delay circuit 126. The level error decision part 128 decides an error of the signal according to the method described later by using the sign values, the absolute values, and the output signal.

The error is input to the coefficient calculator 130 from the level error decision part 128, and the coefficient calculator 130 calculates new coefficients of the FIR filter 110 by using the error. The calculated coefficients are provided to the FIR filter 110 and the coefficient re-initialization part 140.

The coefficient re-initialization part 140 detects whether there is an abnormality in the gain of the FIR filter 110 by using the new coefficients calculated by the coefficient calculator 130. When it is detected that there is an abnormality, the coefficient re-initialization part 140 outputs a malfunction detection signal for initializing the coefficients of the FIR filter 110 to stable values.

Hereinbelow, an operation of the adaptive equalizer 100 according to the present invention having the above structure will be described.

Figure 5:
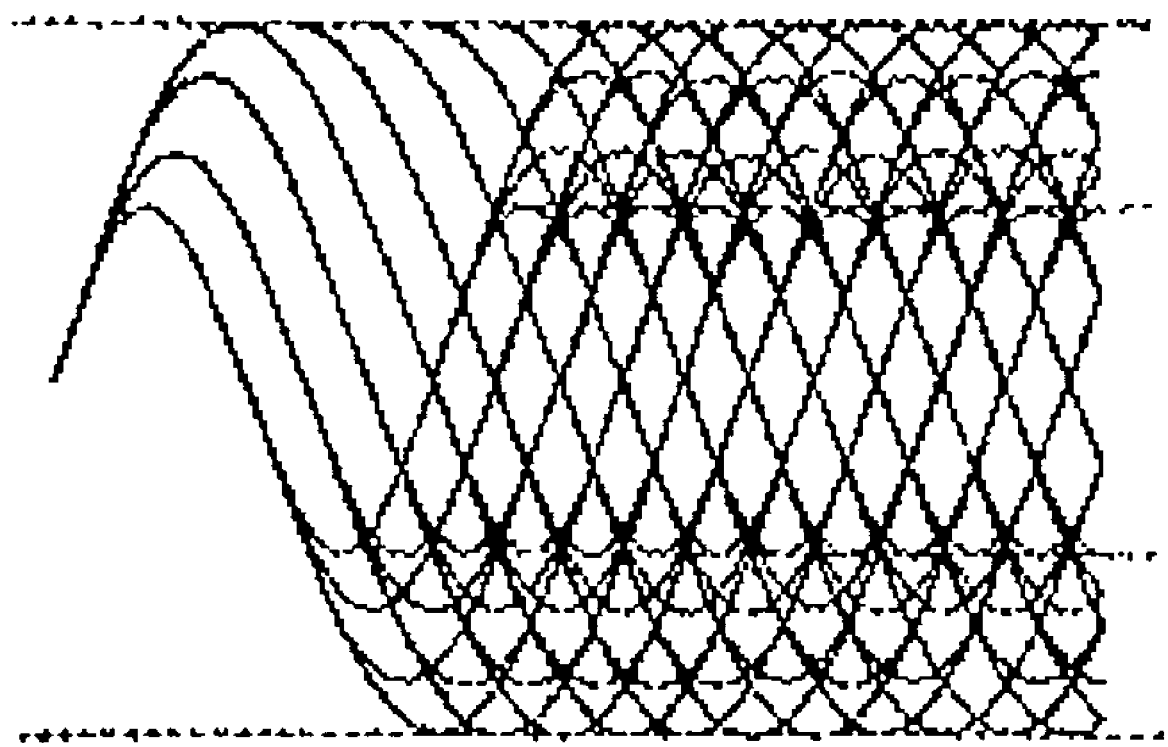
FIG. 5 is an eye diagram of a DVD RF signal.
Figure 6:
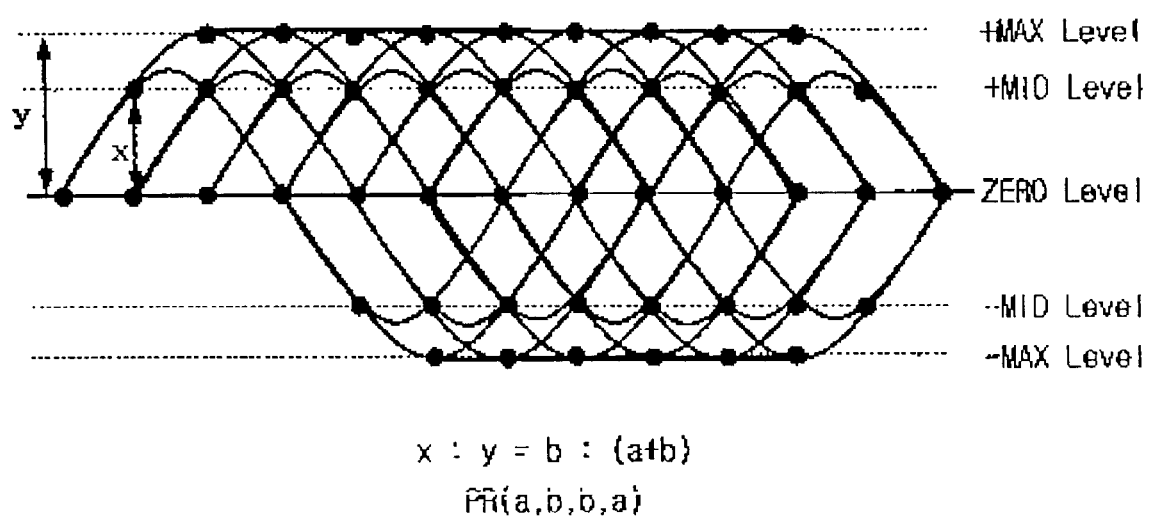
FIG. 6 is an eye diagram of an RF signal in an optical channel model PR (a, b, b, a)

The adaptive equalizer 100 according to the present invention converts the input signal (RF signal of a DVD) having the feature shown in FIG. 5 into an RF signal of an optical model PR (a, b,b, a) shown in FIG. 6, required by the viterbi decoder 46. Then, the adaptive equalizer 100 according to the present invention converts the input RF signal into a digital signal with a low error ratio. Following is a detailed description of the operation of the adaptive equalizer 100.

The input signal input into the FIR filter 110 after being read by the pick-up 34 in a DVD player has a form shown in FIG. 5. As shown in FIG. 5, the input signal has various signal levels according to the values, and the signal level is decided by a physical feature of the disk 32.

FIG. 6 shows the characteristic of the signal required by the viterbi decoder 46. The signal level required by the viterbi decoder 46 is modeled mathematically upon the characteristics thereof, and FIG. 6 shows the reference levels according to the optical channel model PR (a, b, b, a). The channel model PR (a, b, b, a) can be expressed with the following mathematical expression.

$$F(z)=a+bz+bz^2+az^3$$

As known in FIG. 6, the signal levels required by the viterbi decoder 46 are comprised of five types of reference levels: +MAX, +MID, ZERO, −MID, −MAX. Assuming the magnitudes of the MID level and the MAX level are respectively x and y, then $$x:y=b:(a+b).$$

Figure 7:
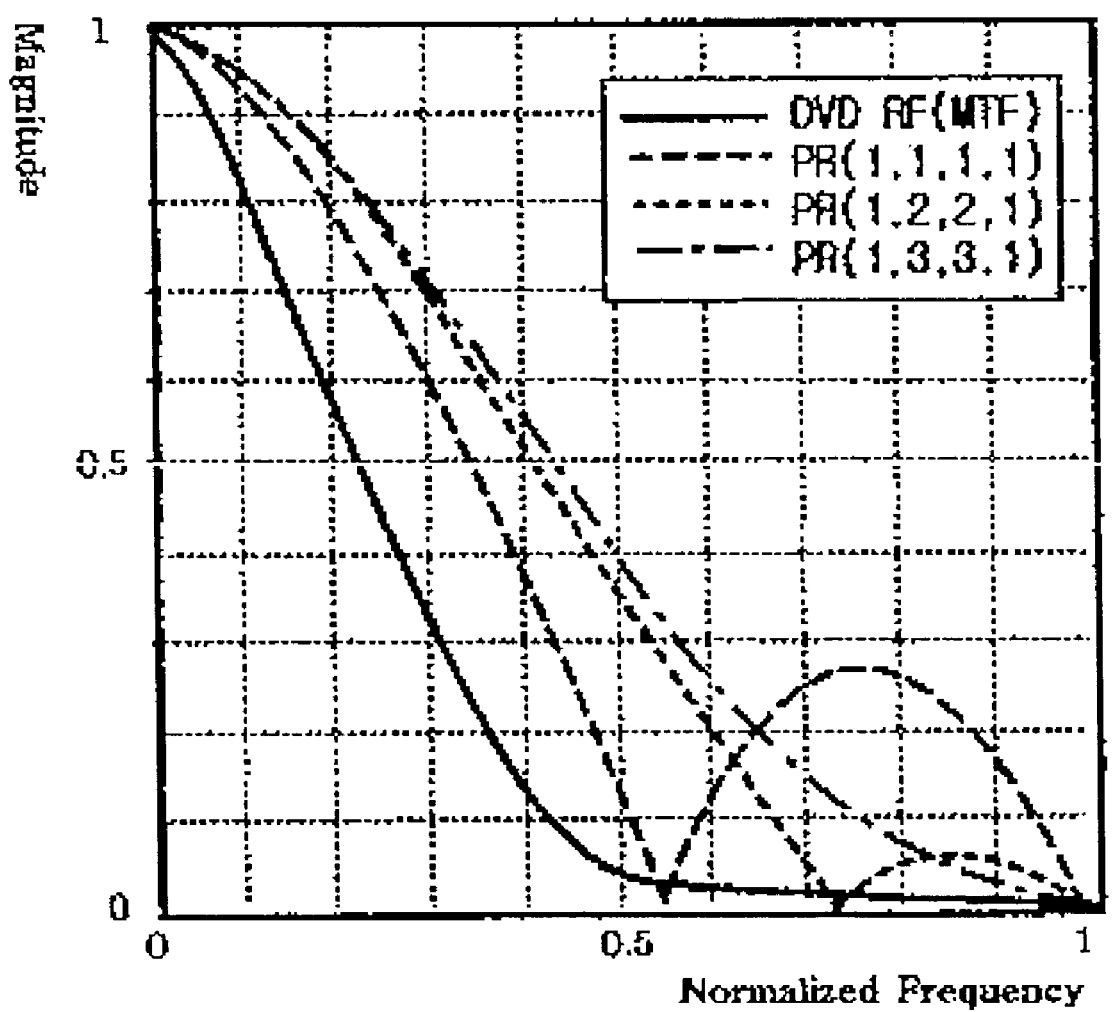
FIG. 7 is a graph showing the feature in a frequency domain of each signal of FIGS. 5 and 6.

FIG. 7 is a graph showing the comparison result of the difference of the characteristic between the input DVD RF signal and the RF signal in a PR (a, b, b, a) model in the frequency domain. The function of the adaptive equalizer 100 according to the present invention is to change the characteristic of the DVD RF signal as shown with a rigid line in FIG. 7 into the characteristic of the RF signal in PR (a, b, b, a) model as shown with a dotted line in FIG. 7.

The error detection part 120 detects the error between the level of the output signal of the FIR filter 110 and the level of the signal in PR (a, b, b, a) model by using the sign values and the absolute values of the input signal through an algorithm shown in FIGS. 8A to 8E.

FIGS. 8A to 8E are views explaining error decision algorithms of the level error detection part 128.

To calculate the error, firstly, it should be decided to which level among the five signal levels (+MAX, +MID, ZERO, −MID, −MAX) the level of the output signal of the FIR filter 110 corresponds. In the present invention, the level of the output signal respectively sampled in the output signal of the FIR filter 110 is calculated by using five sampled output signals. In other words, to calculate the level of one object signal, the object signal, two sampled output signals input before the object signal, and two sampled output signals input after the object signal are used.

At this time, the level error detection part 128 judges that the object signal has a detection level corresponding to a maximum value among the reference levels, when the signs of the object signal and two signals respectively input just before and just after the object signal are identical to each other. At this time, the level error detection part 128 judges that the object signal has the detection level corresponding to the maximum value among the reference levels, when magnitudes of the object signal and two signals respectively input just before and after the object signal are all greater than a predetermined threshold value.

Furthermore, the level error detection part 128 judges that the object signal has a detection level corresponding to one of a middle value and zero value among the reference values, when the signs of the object signal and two signals respectively input just before and just after the object signal are not identical to each other. At this time, whether the object signal has the middle value or zero value is judged by the comparison result of the magnitudes of the two adjacent signals.

Following is a detailed description referring to FIGS. 8A through 8E.

In FIGS. 8A through 8E, the object output signal is marked as 'c', two signals sampled before the object output signal 'c' are marked as 'd' and 'e', and two signals sampled after the object output signal 'c' are marked as 'a' and 'b'.

Figure 8A:
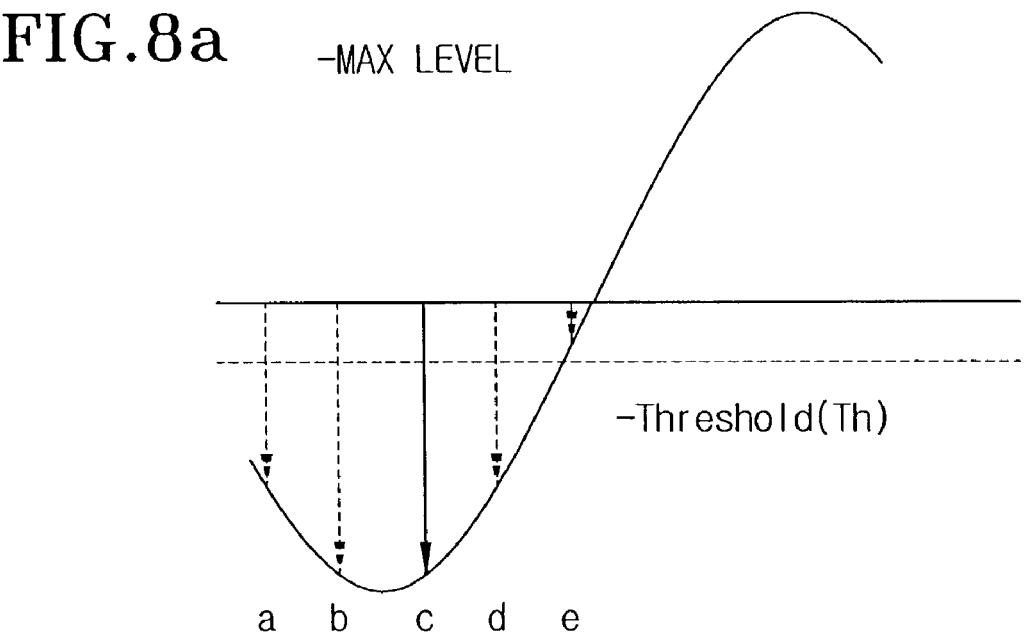
FIGS. 8A to 8E are views explaining error decision algorithms of a level error decision block.

As shown in FIG. 8A, in case the object signal 'c' has the level of −MAX, the signs of the adjacent signals 'b' and 'd' are all negative. In addition, it can be known that the values of the adjacent signals 'b' and 'd' are all less than a negative threshold value −Th (in other words, the absolute value of two signals 'b' and 'd' are all greater than the threshold value Th). It is expressed as the following mathematical expression ('sgn' means the sign of the signal and 'abs' means the absolute value of the signal).

$$\{sgn(b)=sgn(c)=sgn(d)=-1\}\&\ \{abs(b)>Th\}\&\ \{abs(c)>Th\}\&\ \{abs(d)>Th\}$$

Therefore, when the state of the five signals including the object signal corresponds to the above mathematical expression, it is judged that the object signal 'c' falls into the detection level of −MAX. Comparing the threshold value Th of the signal and the absolute value of the signal introduces an effect of removing signals added by the noise from the detection object, since the absolute value of the noise signal is generally less than a certain threshold value Th.

In FIGS. 8B through 8E, the conditions for judging the level of the object signal 'c' as −MID, ZERO, +MID, +MAX are expressed as mathematical expressions in accordance with the above principle.

Figure 8B:
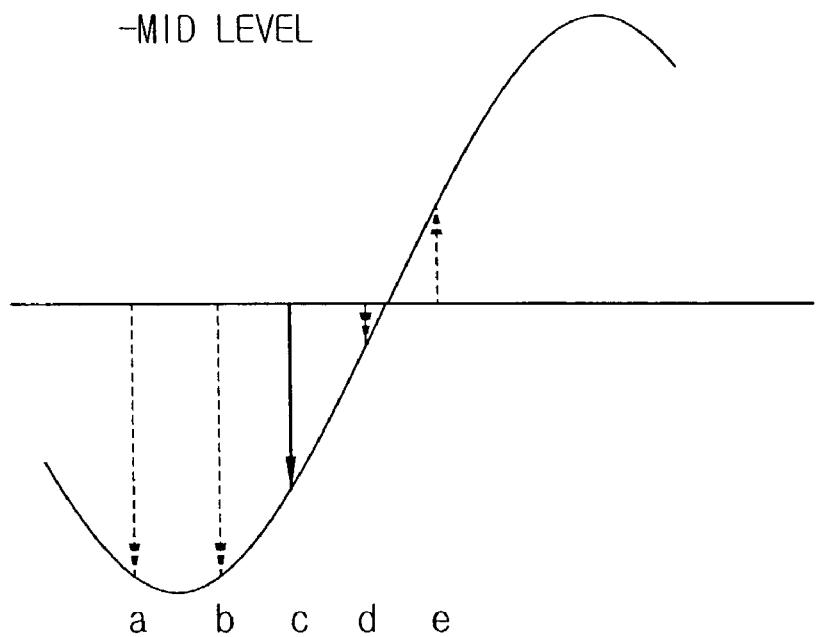

According to FIG. 8B, when the state of the output signal falls into one of the following mathematical expressions, $$\text{Case 1:}\{sgn(a)=+1\}\&\ \{sgn(b)=-1\}\&\ \{abs(a)>abs(b)\}$$

$$\text{Case 2:}\{sgn(b)=+1\}\&\ \{sgn(c)=-1\}\&\ \{abs(b)<abs(c)\}$$

Case 3:{sgn(c)=−1}& {sgn(d)=+1}& {abs(c)>abs(d)}

Case 4:{sgn(d)=−1}& {sgn(e)=+1}& {abs(d)<abs(e)} then it is judged that the signal has the detection level of −MID. FIG. 8B shows the example of case 4 among the above cases.

Figure 8C:
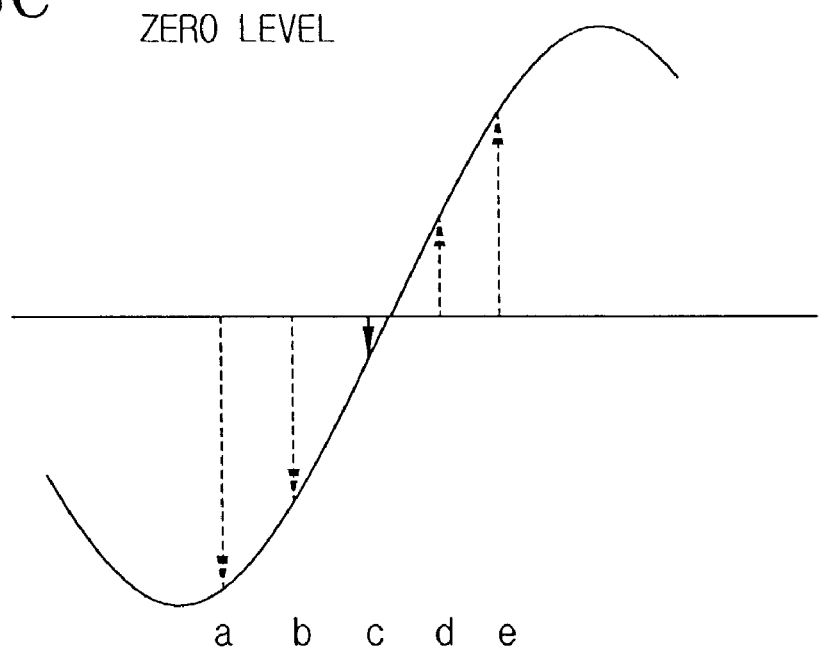

According to FIG. 8C, when the state of the output signal falls into one of the following mathematical expressions, Case 1:{sgn(c)≠sgn(d)}& {abs(c)<abs(d)}

Figure 8D:
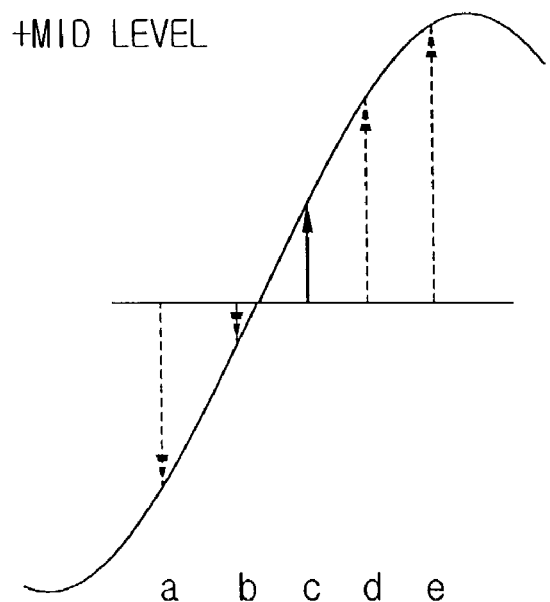

Case 2:{sgn(b)≠sgn(c)}& {abs(b)>abs(c)} then it is judged that the signal has the detection level of ZERO. In FIG. 8D, the example corresponding to case 1 among the above cases is shown.

According to FIG. 8D, when the state of the output signal falls into one of the following mathematical expressions, Case 1:{sgn(a)=−1}& {sgn(b)=+1}& {abs(a)>abs(b)}

Case 2:{sgn(b)=−1}& {sgn(c)=+1}& {abs(b)<abs(c)}

Case 3:{sgn(c)=+1}& {sgn(d)=−1}& {abs(c)>abs(d)}

Case 4:{sgn(d)=+1}& {sgn(e)=−1}& {abs(d)<abs(e)} then it is judged that the signal has the detection level of +MID. In FIG. 8D, the example corresponding to case 2 among the above cases is shown.

Figure 8E:
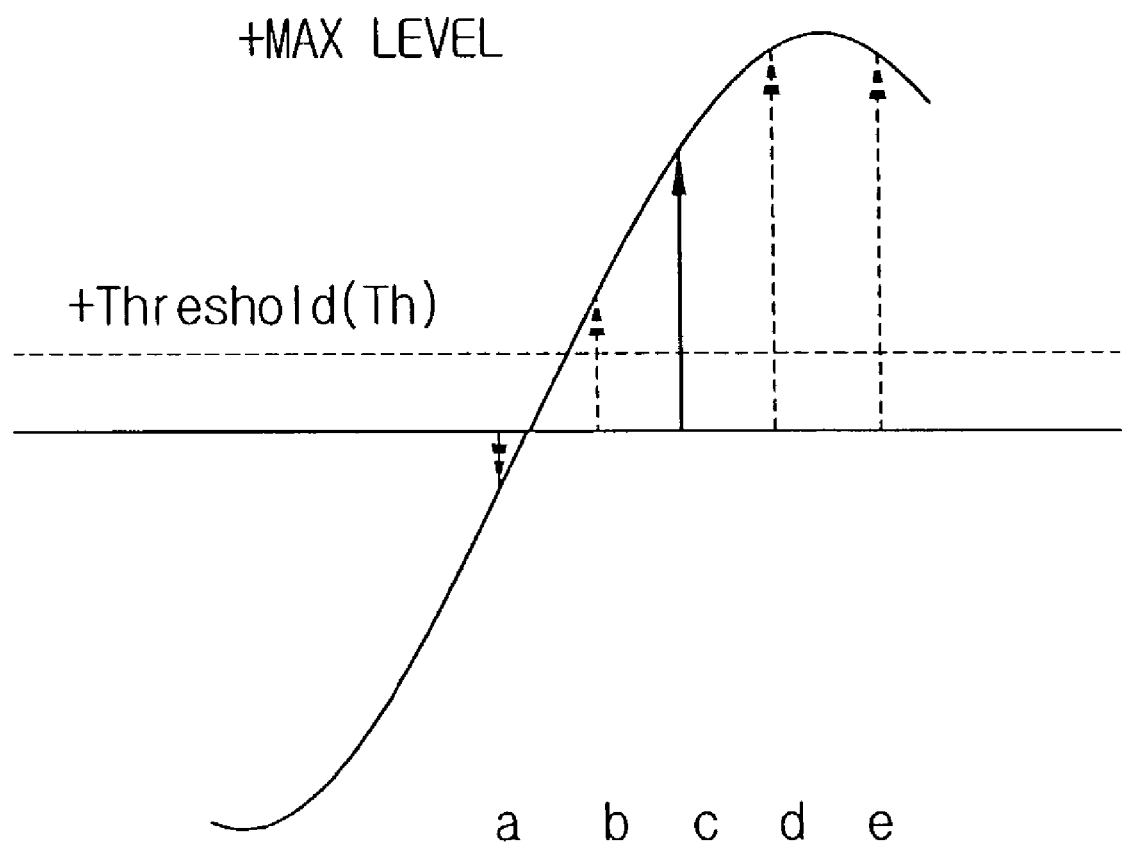

According to FIG. 8E, when the state of the output signal falls into the following mathematical expression, {sgn(b)=sgn(c)=sgn(d)=+1}& {abs(b)>Th}& {abs(c)>Th}& {abs(d)>Th} then it is judged that the signal has the detection level of +MAX.

The level error detection part 128 in the error detection part 120 calculates the error of every data value by calculating the difference between the level of the output signal of the FIR filter 110 judged according to the above criteria and the actual level of the output signal of the FIR filter 110.

The calculated error is used for calculating new coefficients at the coefficient calculator 130 by the LMS (least mean square) adaptive equalization algorithm expressed as the following mathematical expression.

$W_{k+1} = W_k + 2\mu \epsilon X_k$ (here, $W_{k+1}$ is a new coefficient value of the FIR filter,
$W_k$ is a current coefficient value of the FIR filter,
$X_k$ is a current input value of the FIR filter,
$\epsilon$ is a level error value, and
$\mu$ is an equalization gain.)

The calculated coefficient values are provided to the FIR filter 110, and accordingly, the characteristic of the FIR filter 110 is controlled to output the output signal having a signal level optimized to the viterbi decoder 46 of PR (a, b, b, a) model.

The coefficient re-initialization part 140 examines all of the coefficients calculated by the coefficient calculator 130, and detects whether the DC gain of the FIR filter 110 is too great or too small. When it is too great or too small, it is judged that the adaptive equalizer 100 cannot converge but diverges. Therefore, the coefficient re-initialization part 140 re-initializes the coefficient values so that the coefficients of the FIR filter 110 can be initialized to stable values, and thus the instability of the entire system is overcome.

At this time, the DC gain of the FIR filter 110 can be easily calculated by adding all coefficient values input into the FIR filter 110. The re-initialization of the coefficients of the FIR filter 110 can be performed by first causing the coefficient re-initialization part 140 to transmit a malfunction detection signal to the coefficient calculator 130 and then causing the coefficient calculator 130 to set up the coefficient values output to the FIR filter 110 as the stable initial values.

According to the present invention, unlike the conventional adaptive equalizer that judges a zero point of the input signal considering only the sign of the input signal, the adaptive equalizer 100 of the present invention uses not only the sign of the signal but also the value of the signal for calculating the error. Therefore, the reliability of the error calculation increases.

In addition, it is judged that the adaptive equalizer 100 cannot converge but diverges when the DC gain of the FIR filter 110 is too great or too small, considering the coefficients of the FIR filter 110 calculated by the coefficient calculator 130. When it is judged that the adaptive equalizer 100 diverges, the coefficient re-initialization part 140 initializes the coefficients of the FIR filter 110 as stable values, thus the stable operation of the adaptive equalizer 100 is guaranteed.

Accordingly, the PRML block 38 for an optical disk applying the present invention, has a low BER (bit error rate) when converting the input RF signal into the digital value, and can improve the stability of the optical disk system.

So far, the preferred embodiment of the present invention has been illustrated and described. However, the present invention is not limited to the preferred embodiment described here, and someone skilled in the art can modify the present invention without distorting the point of the present invention claimed in the appended claims.

What is claimed is:

1. An adaptive equalizer comprising:
   an FIR filter for generating an equalized output signal by equalizing an RF input signal;
   a sign detector for detecting a sign of the output signal;
   an absolute value calculator for calculating an absolute value of the output signal;
   a level error detection part for detecting a detection level of the output signal using the sign and the absolute value, the detection level which is one of reference values required by a channel characteristic model of a decoder provided with the output signal, the level error detection part for calculating an error which is a difference between the detection level and an actual level of the output signal; and
   a coefficient calculator for calculating coefficients of the FIR filter based on the error, and for providing the calculated coefficients to the FIR filter.

2. The adaptive equalizer as claimed in claim 1, wherein the level error detection part detects the detection level, by using an object signal which is an object for detecting the detection level, and a predetermined number of signals input before and after the object signal.

3. The adaptive equalizer as claimed in claim 2, wherein the level error detection part judges that the object signal has the detection level corresponding to a maximum value among the reference levels when the signs of the object signal and two signals respectively input just before and just after the object signal are identical to each other.

4. The adaptive equalizer as claimed in claim 3, wherein the level error detection part judges that the object signal has the detection level corresponding to the maximum value among the reference levels when magnitudes of the object signal and the two signals respectively input just before and just after the object signal are all greater than a predetermined threshold value.

5. The adaptive equalizer as claimed in claim 2, wherein the level error detection part judges that the object signal has the detection level corresponding to one of a middle value and a zero value among the reference levels when the signs of the object signal and two signals respectively input just before and just after the object signal are not identical to each other.

6. The adaptive equalizer as claimed in claim 5, wherein the level error detection part judges the detection level according to a comparison result of magnitudes of the two signals input just before and just after the object signal.

7. The adaptive equalizer as claimed in claim 1, further comprising a coefficient re-initialization part for judging whether a gain of the FIR filter diverges or not, based on the coefficients, the coefficient re-initialization part for providing a malfunction detection signal to the coefficient calculator when judging that the FIR filter diverges.

8. The adaptive equalizer as claimed in claim 7, wherein the coefficient calculator sets predetermined initial values as the coefficients and provides the coefficients to the FIR filter, when the malfunction detection signal is input thereto.

9. The adaptive equalizer as claimed in claim 1, wherein the level error detection part detects the detection level based on a comparison of at least two samples of the output signal.

10. An adaptive equalizing method comprising the steps of:
calculating a sign and an absolute value of an equalized output signal which is an output of an FIR filter generated by equalizing an RF input signal;
detecting a detection level of the output signal using the sign and the absolute value, the detection level which is one of reference values required by a channel characteristic model of a decoder provided with the output signal;
calculating an error which is a difference between the detection level and an actual level of the output signal;
calculating coefficients of the FIR filter based on the error; and
providing the calculated coefficients to the FIR filter.

11. The adaptive equalizing method as claimed in claim 10, wherein, in the detecting step, the detection level is detected, by using an object signal which is an object for detecting the detection level, and a predetermined number of signals input before and after the object signal.

12. The adaptive equalizing method as claimed in claim 11; wherein, in the detecting step, the object signal is judged to have the detection level corresponding to a maximum value among the reference levels when the signs of the object signal and two signals respectively input just before and just after the object signal are identical to each other.

13. The adaptive equalizing method as claimed in claim 12, wherein, in the detecting step, the object signal is judged to have the detection level corresponding to the maximum value among the reference levels when magnitudes of the object signal and the two signals respectively input just before and just after the object signal are all greater than a predetermined threshold value.

14. The adaptive equalizing method as claimed in claim 11, wherein, in the detecting step, the object signal is judged to have the detection level corresponding to one of a middle value and zero value among the reference levels when the signs of the object signal and two signals respectively input just before and just after the object signal are not identical to each other.

15. The adaptive equalizing method as claimed in claim 14, wherein, in the detecting step, the detection level is detected according to a comparison result of the magnitudes of the two signals input just before and just after the object signal.

16. The adaptive equalizing method as claimed in claim 10, further comprising the steps of:
judging whether a gain of the FIR filter diverges or not, based on the coefficients; and
generating a malfunction detection signal when it is judged that the FIR filter diverges.

17. The adaptive equalizing method as claimed in claim 16, further comprising a step of initializing the coefficients to predetermined initial values when the malfunction detection signal is generated.

18. The adaptive equalizer as claimed in claim 10, wherein in detecting the detection level, the detection level is detected by comparing at least two samples of the output signal.

* * * * *